March 31, 1959 S. F. LETO ET AL 2,879,651
UNIVERSAL JOINT
Filed Oct. 10, 1955
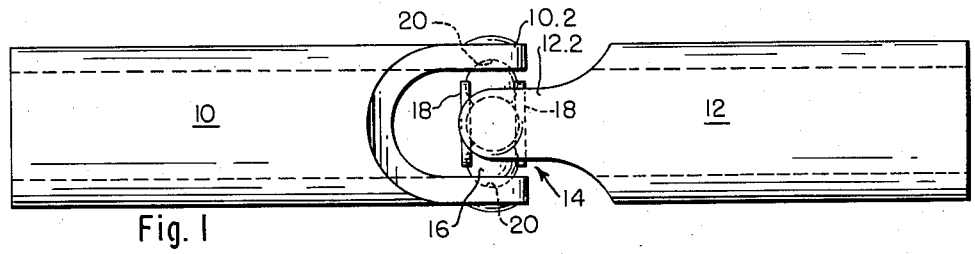
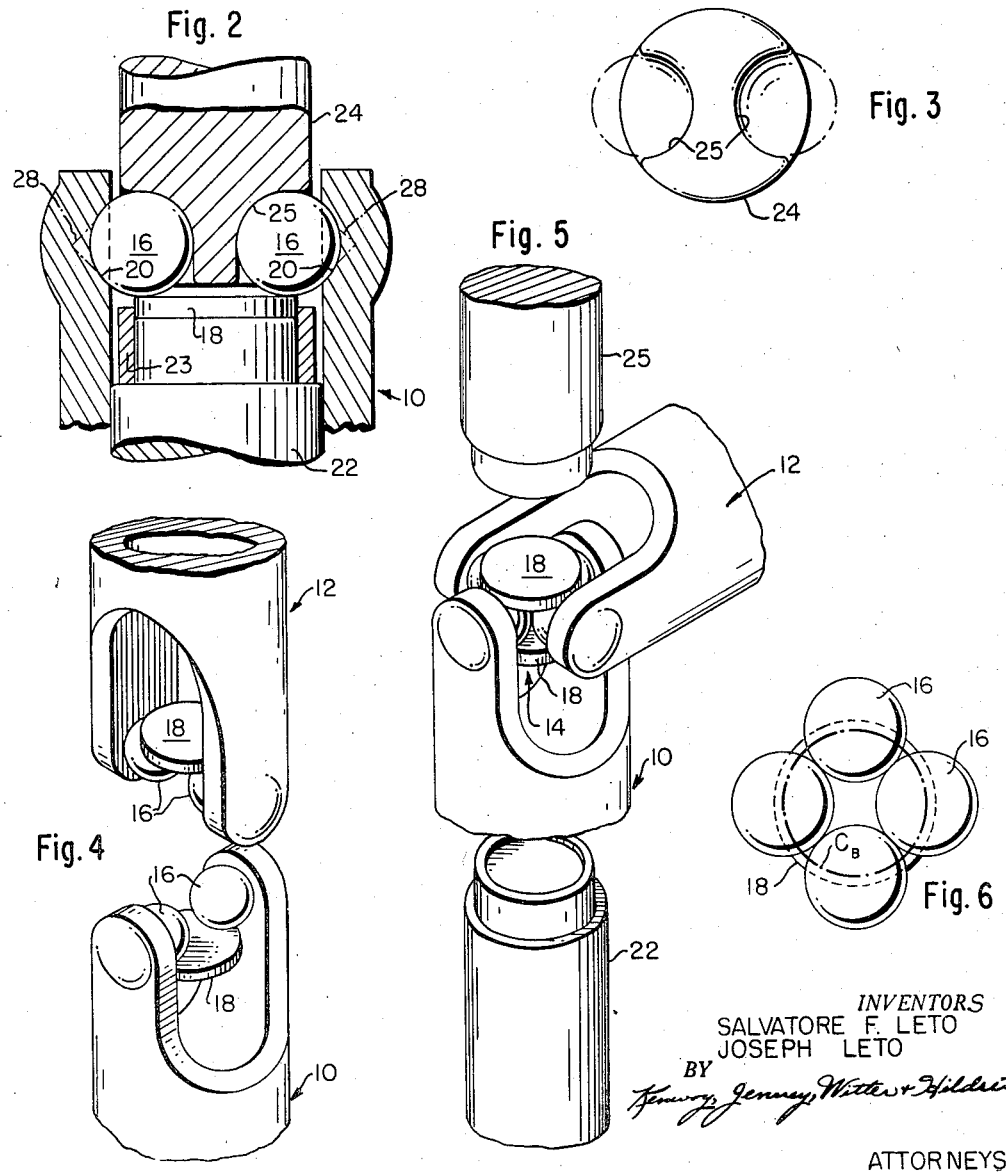
INVENTORS
SALVATORE F. LETO
JOSEPH LETO
BY
ATTORNEYS

United States Patent Office 2,879,651
Patented Mar. 31, 1959

2,879,651

UNIVERSAL JOINT

Salvatore F. Leto, Arlington, and Joseph Leto,
Lexington, Mass.

Application October 10, 1955, Serial No. 539,613

8 Claims. (Cl. 64—17)

This invention consists in a novel construction for universal joints of the type commonly referred to as a Hooke's coupling and in a novel method of making them. Its principal object is to provide universal joints of extremely small size yet having substantial strength and freedom from backlash and friction losses. A typical joint embodying this invention may have a maximum diameter transverse to the shaft axis of 3/16 inch.

A universal joint of the Hooke's coupling type consists typically of a pair of forked members each of which is axially aligned with one of a pair of shafts having intersecting axes. The forked members are joined by a coupling member which pivotally connects with each fork and positions them on shaft diameters 90° apart. Such a construction requires strong pivotal connections between the forks and the connecting member which are most desirably free from backlash or "play" and of low frictional resistance.

The present invention provides a novel coupling, and method of assembly therefor, which may be of extremely small dimensions but which avoids the structural disadvantages and numerous difficulties encountered in the assembly of prior art constructions.

In the coupling of the present invention, the forks are each formed with inwardly facing socket members and the coupling member is formed with ball sections which are received in the sockets. The joint is held together entirely by the coupling member which is of sufficient rigidity and strength to hold the ball sections in the sockets, and the sockets are of sufficient depth to hold the balls, and the associated coupling member, securely in place. The balls are not independently joined to the sockets.

Most conveniently, the coupling member comprises four balls arranged in diametrically opposed pairs fixed in a base circle in contiguous coplanar quadrant relation. That is to say, the balls are in contact, thus assuring maximum rigidity and strength, and are joined together with their centers lying in a circle of which each ball spans a quadrant.

The assembly of coupling members of this invention is accomplished in a manner permitting the various elements to be constructed of maximum strength consistent with the size of the couplings. In general, the assembly process consists in first arranging the separate ball members in their corresponding sockets in the arms of the forks and fixing them in place before the forks are coupled. The ball members are thus arranged on each fork in pairs as opposite quadrant sections of the coupling member, and are subsequently joined with the pair of ball members of the other fork which are positioned in the remaining quadrants. This may be done by bringing the two forks together such that one pair of ball members is axially inserted in engaging coplanar quadrant relation with the other pair of ball members, and then joining the two pairs securely together as by spot welding, brazing, silver soldering or the like.

When so assembled, the ball members are securely fixed with each ball section received in the corresponding socket. This assembly process does not involve bending or otherwise deforming either the arms of the forks or the coupling members, and thus makes it possible to construct the joint with maximum strength. In preferred embodiments, the balls and separate forks are initially joined together at spacings smaller than the final spacing. When the forks are inserted together in the final assembly, force is apgplied to bring the balls together, causing them to spread slightly whereby a snug play-free joint is assured.

This invention is described below in greater detail with reference to the presently preferred embodiment, which has been selected for purposes of illustration. Reference is made to the drawings in which:

Fig. 1 is a side elevation of a typical embodiment of this invention,

Fig. 2 is a side view in cross-section showing an embodiment of the process of assembling the coupling shown in Fig. 1, Fig. 3 is an end view of an electrode used in positioning and spot welding the ball members in place, Fig. 4 is a perspective view showing the two forked members being positioned in assembled relation, Fig. 5 is a perspective view showing the arrangement of the two forked members and the electrodes during a final spot welding operation, and Fig. 6 is a diagram showing the contiguous coplanar quadrant relation of the ball members and the plate underlying them.

The preferred embodiment shown in the drawings consists of a pair of tubular forked members 10 and 12 joined together by a coupling member 14 to which the forked ends 10.2 and 12.2 are pivotally joined at mutually right angles. Forks 10 and 12 are conveniently cut from tube stock to form opposed arms. The sockets 10.2 and 12.2 are then pressed into the arms, conveniently by using a ball of the type employed in the coupling member as an anvil and swaging or cold forming the socket around it.

The coupling member consists of two pairs of balls 16 mounted between a pair of plates 18—18 with the members of each pair diametrically opposed and engaged in sockets 20 formed in the forked ends 10.2 and 12.2 of the forked members. As best shown in Fig. 6, the balls are in contact and lie coplanar with their centers lying in a common base circle, designated $C_b$, of diameter 1.414 times the diameter of each ball. Thus, each ball occupies a quadrant of the base circle and their relationship is designated herein as a contiguous, coplanar quadrant relation.

The assembly of a joint of this construction consists in first positioning one of the forked members 10 about a lower electrode 22, positioning one of the plates 18 on top of the electrode, then positioning the balls 16 on the plate 18 within the sockets 20 and welding them in place to the plate 18 under the contact of an upper electrode 24. To facilitate positioning and assembly of the several elements, the lower electrode is formed with a recessed upper surface defined by a collar 23 surrounding a necked down upper portion of the electrode and extending slightly above the upper end. The disk 18 then fits within the collar 23 and is accurately positioned by it while the wider lower part of the electrode engages the inner surface of the forked member and positions it in proper relative position.

The upper electrode 24 is formed with two diametrically opposed indentations 25 each conforming to the shape of one of the ball members, and serves to hold the balls in place preliminary to the welding operation. Conveniently, and to assure a snug fit, the forks 10.2 and 12.2 and the upper electrode are formed to space the balls apart a distance which is slightly less than the diameter of the base circle $C_b$, the diameter of the base circle being assumed in the final assembly step.

Both forked members 10 and 12 are assembled with their corresponding balls 16 and plate 18 in this manner, the ball-and-plate assembly of each comprising half the coupling member 14. The two sections are then brought together, as suggested by Fig. 4, with the respective forks at right angles so that the balls 10 of each flank the balls of the other. A pressure forcing the balls apart to lie in the base circle, assuring a snug backlash free assembly, is then brought to bear on the opposed plates 18—18, and the now assembled coupling member 14 is welded together. Conveniently, the forked members are assembled by placing one of them upright over the lower electrode 22 with its plate 18 resting on the top of the electrode, then turning the upper forked member 12 to one side and bringing a flat bottomed upper electrode 25 down on the upper plate 18 with sufficient force to assemble the balls and plates. Current is then supplied to the electrodes to weld the coupling member together. The arrangement for this operation is shown in Fig. 5.

The joint is then removed and ready for use in the customary way.

Although ideally suited for providing universal joints of very small size, this invention is also applicable to the construction of larger units. The joints so formed have proved extremely useful in the instrumentation field not only because of their small size but also because of the low friction and freedom from backlash which make precise action possible.

A feature which may be provided to assure a tight connection under conditions of extreme wear is the removal of material from the inner parts of the sockets, to form a recess which limits contact to the outer wearing parts of the socket surface, as suggested by the dotted lines 28 in Fig. 2. As little wearing of the socket occurs in the central inner region, wear can result in loss of tightness between a ball 16 and its corresponding socket 20, particularly if the unworn central portions are present to limit the accommodation of the ball in the socket. By removing the central region, the fork is free to move the socket inwardly under the tension imparted during assembly, and thus maintain a tight contact notwithstanding considerable wear. The method of assembly described above, in which the sockets are originally formed to locate the balls apart a distance less than the diameter of the base circle provides a tension on the forks during final assembly which assures a degree of wear-accommodating motion in this manner.

Although described with reference to the preferred embodiment, it is contemplated that obvious modifications will occur to those skilled in the art, and that such may be made without departing from the scope of this invention.

Having thus disclosed our invention and described in detail a preferred embodiment thereof, we claim as new and desire to secure by Letters Patent:

1. A universal joint for joining a pair of rotatable shafts having intersecting axes comprising a first shaft-axis-aligned fork member having a pair of arms formed with diametrically opposed inwardly facing sockets, a second shaft-axis-aligned fork member having a pair of arms formed with diametrically opposed inwardly facing sockets, the sockets of the said fork members being centered in the same plane with those of one fork member being aligned 90° from the alignment of the other fork member, and coupling means joining said fork members comprising two diametrically opposed pairs of ball members each having a surface section received in one of said sockets, said ball members being fixed in contiguous coplanar quadrant relation.

2. A universal joint for joining a pair of rotatable shafts having intersecting axes comprising a first shaft-axis-aligned fork member having a pair of arms formed with diametrically opposed inwardly facing sockets, a second shaft-axis-aligned fork member having a pair of arms formed with diametrically opposed inwardly facing sockets, the sockets of the said fork members being centered in the same plane with those of one fork member being aligned 90° from the alignment of the other fork member, and coupling means joining said fork members comprising two diametrically opposed pairs of ball members each having a surface section received in one of said sockets, said ball members being joined together to a base member in contiguous coplanar quadrant relation.

3. A universal joint for joining a pair of rotatable shafts having intersecting axes comprising a first shaft-axis-aligned fork member having a pair of arms formed with diametrically opposed inwardly facing sockets, a second shaft-axis-aligned fork member having a pair of arms formed with diametrically opposed inwardly facing sockets, the sockets of the said fork members being centered in the same plane with those of one fork member being aligned 90° from the alignment of the other fork member, and coupling means joining said fork members comprising two diametrically opposed pairs of ball members each having a surface section received in one of said sockets, said ball members being joined between a pair of plates in contiguous coplanar quadrant relation.

4. A method of forming a universal joint for joining a pair of rotatable shafts having intersecting axes, said joints comprising a pair of forks each of which includes a pair of arms formed with diametrically opposed inwardly facing sockets symmetrical with one of the shaft axes, and a coupling member joining said forks with their sockets aligned in the same plane and paired 90° from each other; the method comprising assembling ball members in the sockets of one fork and fixing them in position, assembling ball members in the sockets of the other fork and fixing them in position, positioning the forks in assembled relation, and securing the ball members together into a unitary construction coupling said forks together.

5. A method of forming a universal joint for joining a pair of rotatable shafts having intersecting axes, said joints comprising a pair of forks each of which includes a pair of arms formed with diametrically opposed inwardly facing sockets symmetrical with one of the shaft axes, and a coupling member joining said forks with their sockets aligned in the same plane and paired 90° from each other; the method comprising assembling ball members comprising opposed quadrant sections of the coupling in the sockets of one fork and fixing them in position, assembling ball members comprising opposed quadrant sections of the coupling in the sockets of the other fork and fixing them in position, positioning the forks in assembled relation, and securing the ball members together into a unitary construction coupling said forks together.

6. A method of forming a universal joint for joining a pair of rotatable shafts having intersecting axes, said joints comprising a pair of forks each of which includes a pair of arms formed with diametrically opposed inwardly facing sockets symmetrical with one of the shaft axes, and a coupling member joining said forks with their sockets aligned in the same plane and paired 90° from each other; the method comprising assembling ball members in the sockets of one fork and fixing them in position, assembling ball members in the sockets of the other fork and fixing them in position, positioning the forks in assembled relation, by axially inserting one pair of ball members in engaging coplanar quadrant relation with the other pair of ball members, and securing the ball members together into a unitary construction coupling said fork together.

7. A method of forming a universal joint for joining a pair of rotatable shafts having intersecting axes, said joints comprising a pair of forks each of which includes a pair of arms formed with diametrically opposed inwardly facing sockets symmetrical with one of the shaft axes, and a coupling member joining said forks with their sockets aligned in the same plane and paired 90° from each other; the method comprising positioning each fork around a central electrode with the arms of the fork extending beyond the end of the electrode, positioning a metal plate at the end of the electrode between the arms, positioning ball members in each socket in contact with the plate, and applying a second electrode to the ball members and energizing said electrodes to spot weld the ball members in place to the plate, thus pre-assembling a pair of ball members in each fork, then positioning the forks in assembled relation with the ball members in engaging coplanar quadrant relation between the plates, and applying an electric current across the plates to weld the ball members together between the plates.

8. A method of forming a universal joint for joining a pair of rotatable shafts having intersecting axes, said joints comprising a pair of forks each of which includes a pair of arms formed with diametrically opposed inwardly facing sockets symmetrical with one of the shaft axes, and a coupling member joining said forks with their sockets aligned in the same plane and paired 90° from each other; the method comprising assembling ball members comprising opposed quadrant sections of the coupling member in the sockets of one fork, assembling ball members comprising opposed quadrant sections of the coupling member in the sockets of the other fork, positioning the forks in assembled relation with one pair of ball members in contiguous coplanar quadrant relation with the other pair of ball members, and securing the ball members together into a unitary construction coupling said forks together.

References Cited in the file of this patent
UNITED STATES PATENTS

| | | |
|---|---|---|
| 677,869 | Kinsler | July 9, 1901 |
| 1,226,689 | Nedoma | May 22, 1917 |
| 1,700,991 | Wintercorn | Feb. 5, 1929 |
| 1,705,731 | Hufferd | Mar. 19, 1929 |